United States Patent
Hovinga et al.

(10) Patent No.: US 10,274,751 B2
(45) Date of Patent: Apr. 30, 2019

(54) PRISM BALLASTED CONTACT LENS

(71) Applicant: Bausch & Lomb Incorporated, Rochester, NY (US)

(72) Inventors: Kristen R. Hovinga, Honeoye Falls, NY (US); Anita M. Graney, Rochester, NY (US)

(73) Assignee: Bausch & Lomb Incorporated, Rochester, NY (US)

( * ) Notice: Subject to any disclaimer, the term of this patent is extended or adjusted under 35 U.S.C. 154(b) by 0 days.

(21) Appl. No.: 15/640,207

(22) Filed: Jun. 30, 2017

(65) Prior Publication Data
US 2018/0011342 A1    Jan. 11, 2018

Related U.S. Application Data

(60) Provisional application No. 62/358,416, filed on Jul. 5, 2016.

(51) Int. Cl.
G02C 7/04 (2006.01)

(52) U.S. Cl.
CPC .............. *G02C 7/048* (2013.01); *G02C 7/044* (2013.01); *G02C 7/041* (2013.01)

(58) Field of Classification Search
CPC ........ G02C 7/049; G02C 7/048; G02C 7/044; G02C 7/041
USPC ........................................ 351/159.21, 159.13
See application file for complete search history.

(56) References Cited

U.S. PATENT DOCUMENTS

| | | | | |
|---|---|---|---|---|
| 4,618,277 A | | 10/1986 | Bayshore | |
| 4,859,049 A | * | 8/1989 | Muller | G02C 7/04 351/159.74 |
| 5,020,898 A | * | 6/1991 | Townsley | G02C 7/04 351/159.07 |
| 5,125,728 A | * | 6/1992 | Newman | G02C 7/048 351/159.22 |
| 5,455,641 A | * | 10/1995 | Hahne | G02C 7/04 351/159.22 |
| 5,606,378 A | * | 2/1997 | Van Meurs | G02C 7/043 351/159.02 |
| 5,608,471 A | * | 3/1997 | Miller | G02C 7/043 351/159.41 |
| 5,754,270 A | | 5/1998 | Rehse et al. | |

(Continued)

FOREIGN PATENT DOCUMENTS

| | | |
|---|---|---|
| EP | 1281099 | 2/2003 |
| EP | 1679543 A1 | 7/2006 |

(Continued)

OTHER PUBLICATIONS

International Search Report and Written Opinion of the International Searching Authority in corresponding International Application No. PCT/US2017/040772, completed Sep. 21, 2017 (11 pages).

(Continued)

*Primary Examiner* — William R Alexander
(74) *Attorney, Agent, or Firm* — Andrew J. Anderson, Esq.; Harter Secrest & Emery LLP

(57) ABSTRACT

A contact lens with a toric optical zone has its anterior and posterior optical zone surfaces tilted with respect to one another to forming prism in the optical zone. Thickness profiles of the peripheral region are independent of the tilt angle between the anterior and posterior optical zone surfaces.

17 Claims, 3 Drawing Sheets

(56) References Cited

U.S. PATENT DOCUMENTS

| | | | |
|---|---|---|---|
| 5,815,239 A | 9/1998 | Chapman et al. | |
| 5,880,809 A * | 3/1999 | Lieberman | G02C 7/041 |
| | | | 351/159.02 |
| 6,113,236 A | 9/2000 | Chapman et al. | |
| 7,040,757 B2 | 5/2006 | Hall et al. | |
| 7,052,133 B2 | 5/2006 | Lindacher et al. | |
| 7,172,285 B1 * | 2/2007 | Altmann | G02C 7/028 |
| | | | 351/159.74 |
| 7,628,485 B2 | 12/2009 | Back et al. | |
| 8,801,175 B2 * | 8/2014 | Legerton | B29D 11/00038 |
| | | | 351/159.12 |
| 2005/0041203 A1 * | 2/2005 | Lindacher | G02C 7/028 |
| | | | 351/159.42 |
| 2006/0244903 A1 * | 11/2006 | Ye | G02C 7/04 |
| | | | 351/159.21 |
| 2007/0159593 A1 * | 7/2007 | Hibino | G02C 7/04 |
| | | | 351/159.08 |
| 2009/0303433 A1 * | 12/2009 | Shimojo | G02C 7/043 |
| | | | 351/159.06 |
| 2010/0060849 A1 * | 3/2010 | Hibino | B29D 11/00038 |
| | | | 351/159.73 |
| 2010/0079723 A1 * | 4/2010 | Kingston | A61F 2/1613 |
| | | | 351/159.54 |
| 2012/0242952 A1 * | 9/2012 | Nakajima | G02C 7/048 |
| | | | 351/159.38 |
| 2013/0238090 A1 * | 9/2013 | Pugh | G02B 26/005 |
| | | | 623/6.13 |
| 2015/0362746 A1 * | 12/2015 | Skudder | G02C 7/022 |
| | | | 351/159.22 |
| 2015/0370090 A1 * | 12/2015 | Ehrmann | G02C 7/048 |
| | | | 351/159.36 |
| 2018/0196281 A1 * | 7/2018 | Krall | G02C 7/041 |

FOREIGN PATENT DOCUMENTS

| | | |
|---|---|---|
| EP | 1734398 | 12/2006 |
| WO | 0175509 | 10/2001 |
| WO | 2014124493 A1 | 8/2014 |

OTHER PUBLICATIONS

Meyler, John. "Simultaneous vision designs". In: Nathan Efron: "Contact lens practice". Jan. 1, 2010. pp. 256-258. Butterworth Heinemann Elsevier, XP055408111, ISBN: 978-0-7506-8869-7.

Efron, Nathan "Contact lens practice (Stabilization techniques of soft toric lenses". Jan. 1, 2010. pp. 120-121. Butterworth Heinemann Elsevier, XP055065013.

P.I., Rakow. "The road to presbyopic contact lens success". Internet Citation, Oct. 2001. Retrieved from: http://www.clsa.info/PDF/4Q_01p11-15.pdf [retrieved on Mar. 2, 2009].

* cited by examiner

PRISM BALLASTED CONTACT LENS

BACKGROUND OF THE INVENTION

Contact lenses having a toric optical zone (commonly referred to as "toric contact lenses") are used to correct refractive abnormalities of the eye associated with astigmatism. The toric optical zone provides cylindrical correction to compensate for the astigmatism. Since astigmatism requiring vision correction is usually associated with other refractive abnormalities, such as myopia (nearsightedness) or hypermetropia (farsightedness), toric contact lenses are generally prescribed also with a spherical correction to correct myopic astigmatism or hypermetropic astigmatism. The toric surface may be formed in either the posterior lens surface (back surface toric lens) or in the anterior lens surface (front surface toric lens).

Whereas spherical contact lenses may freely rotate on the eye, toric contact lenses have some type of ballast to inhibit rotation of the lens on the eye so that the cylindrical axis of the toric zone remains generally aligned with the axis of the astigmatism. Toric contact lenses are manufactured with a selected relationship (or offset) between the cylindrical axis of the toric optical zone and the orientation of the ballast. This relationship is expressed as the number of degrees (rotational angle) that the cylindrical axis is offset from the orientation axis of the ballast. Accordingly, toric contact lens prescriptions specify this offset, with toric lenses generally being offered in 5 or 10-degree increments ranging from 0° to 180°.

In summary, a prescription for a toric contact lens will typically specify spherical correction (spherical power), cylindrical correction (cylindrical power) and axes offset to define the optical correction, as well as lens diameter and base curve to define fitting parameters.

One type of ballast is prism ballast, which has proven effective for maintaining a toric contact lens in a desired rotational orientation on the eye. An example of prism ballasting is disclosed in U.S. Pat. No. 6,113,236. Prism may be attained by various manners including: decentering the optic zone of the lens vertically downwards, such that a "wedge" of thickness across the optic zone is achieved; or tilting the entire anterior surface with respect to the posterior surface, such that a "wedge" of thickness across the entire lens is achieved. Then, for either of these approaches, the lens periphery is designed to achieve better fitting and on-eye comfort. However, both of these techniques for introducing prism place limitations on the ability to control the peripheral region of the lens. The two primary levers for changing the peripheral thickness become the amount of decentration or angle of tilt put into the lens, and the lens center thickness (CT) to increase or decrease the overall thickness profile of the lens design. In addition, decentering the lens optic introduces the additional optical higher order aberration coma, which is an undesirable lens feature.

BRIEF SUMMARY OF THE INVENTION

In one aspect, this invention provides a contact lens comprising:

an optical zone and a peripheral region surrounding the optical zone;

a posterior surface comprising a posterior optical zone surface having a posterior center point, and a posterior peripheral zone; and an anterior surface comprising an anterior optical zone surface having an anterior center point, and an anterior peripheral zone;

wherein one of the posterior optical zone and the anterior optical zone surfaces is a toric optical zone surface and the other of the posterior optical zone and the anterior optical zone surfaces is a non-toric optical zone surface;

wherein the posterior and the anterior center points are aligned with one another, such that a centerline intersecting said center points is perpendicular to the toric optical zone surface at its center point;

wherein the non-toric optical zone surface is non-perpendicular to the centerline at its center point, such that the anterior optical zone surface and the posterior optical zone surface are tilted with respect to one another to define a tilt angle therebetween, thereby forming prism in the optical zone;

wherein the posterior and anterior peripheral zones define the peripheral region of the contact lens, and thickness profiles of the peripheral region are independent of said tilt angle.

In one specific aspect, the posterior optical zone surface is a toric optical zone surface and the anterior optical zone surface is a non-toric optical zone surface. In another specific aspect, the anterior optical zone surface is a toric optical zone surface and the posterior optical zone surface is a non-toric optical zone surface.

According to other aspects, the tilt angle has a magnitude between 0.1 and 5 degrees, or a magnitude between 0.5 and 2 degrees, or a magnitude of about 1 degree.

According to another aspect, the thickness profiles of the peripheral region are defined radially, for example, at radial increments. There may be at least twelve radial increments, or at least 24 radial increments.

According to yet another aspect, maximum thicknesses of radial thickness profiles in an inferior section of the peripheral region are greater than radial thickness profiles in a superior section of the peripheral region.

According to other aspects, the non-toric optical zone surface may be spherical or a non-toric asphere, such as an asphere that imparts a predetermined amount of spherical aberration to a refractive correction of the optical zone.

DETAILED DESCRIPTION OF THE INVENTION

Figure 1:
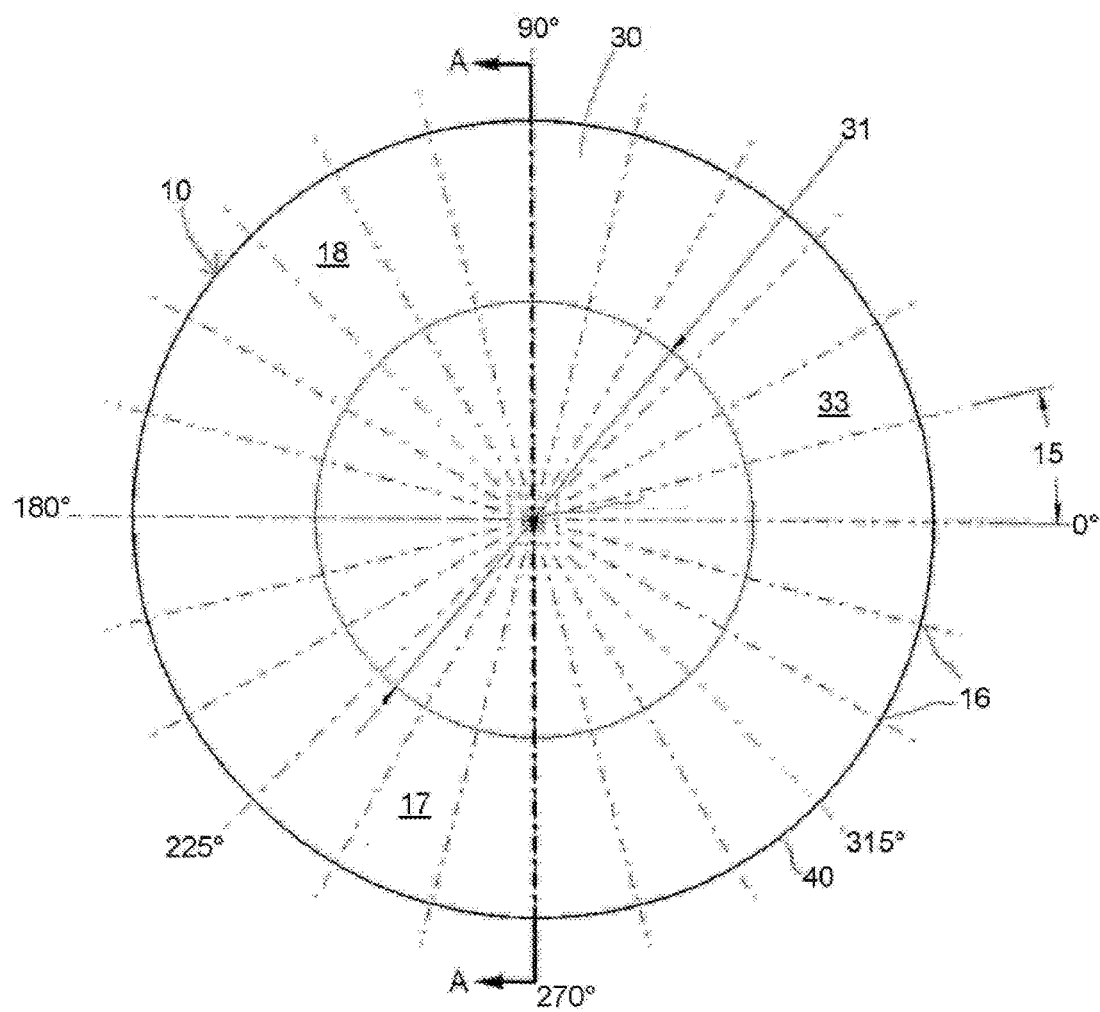
FIG. 1 is a planar view of a toric contact lens anterior surface.
Figure 2:
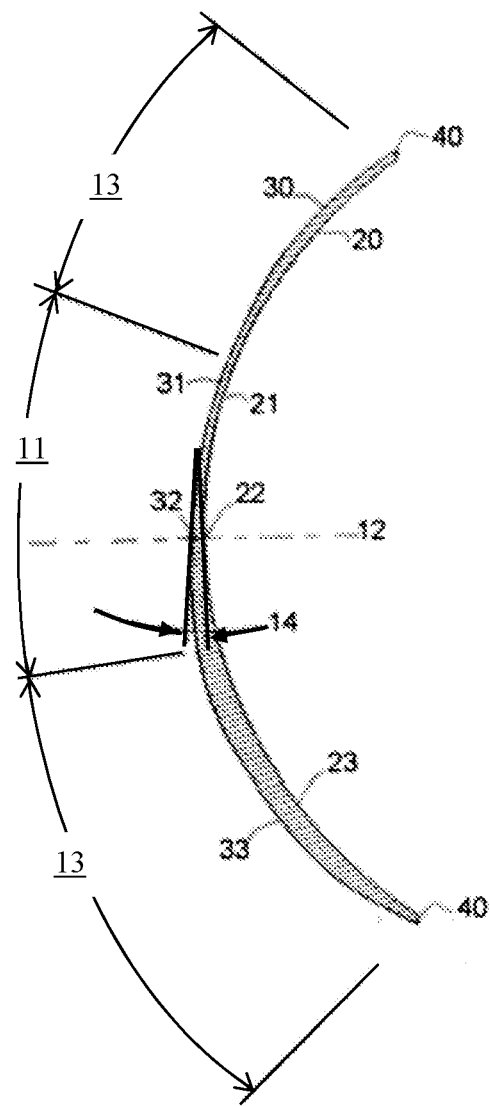
FIG. 2 is a cross-section view taken along line A-A of FIG. 1.

FIGS. 1 and 2 schematically illustrate a toric contact lens according to various aspects of this invention. Toric contact lens 10 includes an optical zone 11 and a peripheral region 13 which terminates at edge 40. Toric contact lens 10 includes a posterior surface 20 and an opposed anterior surface 30. Posterior surface 20 comprises a posterior optical zone surface 21 having a posterior center point 22, and a posterior peripheral zone 23. In the illustrated embodiment, the posterior optical zone surface 21 is toric. Anterior surface 30 comprises an anterior optical zone surface 31 having an anterior center point 32, and an anterior peripheral zone 33. In the illustrated embodiment, the anterior optical zone surface 31 is non-toric.

The posterior and the anterior center points 22, 32 are aligned with one another, such that centerline 12 intersects center points 22, 32. Thus, the optical zones 21, 31 are not decentered with respect to one another, as in some prior prism ballasted toric contact lenses.

Additionally, centerline 12, an imaginary reference line, is perpendicular to the posterior optical zone surface 21 at its center point 22. However, the anterior optical zone surface 31 is not perpendicular to centerline 12 at its center point 32, such that the anterior optical zone is tilted with respect to the posterior optical zone. The tilt between these two surfaces may be defined by tilt angle 14. This tilt between the two optical zone surfaces thereby forms prism in the optical zone of the contact lens. In this illustrated embodiment, the prism is restricted to the optical zone 11.

Figure 3:
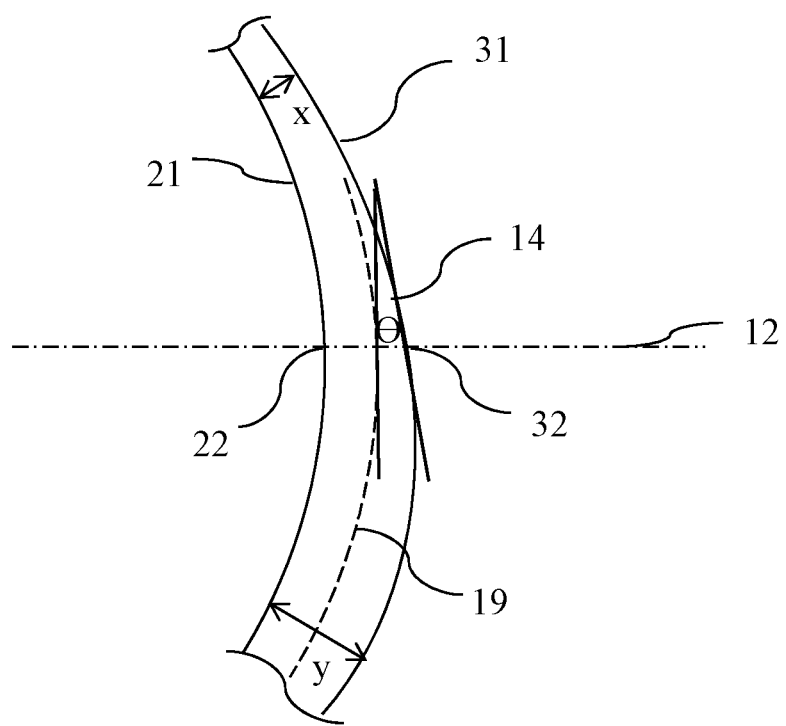
FIG. 3 is a schematic illustration of the tilt angle between the optical zone surfaces.

FIG. 3 schematically illustrates this tilt angle 14, also designated by θ. In the illustrated portion of the optical zone, imaginary line 19 represents the anterior optic zone surface without tilt between the anterior and posterior optical zone surfaces 31, 21, whereby this portion of the optical zone would have a constant thickness x. However, with the imparted tilt between surfaces 31, 21, thickness y is greater than thickness x.

The tilt angle 14 may have a magnitude from 0.1 to 5 degrees, preferably from 0.5 to 2 degrees. In the illustrated embodiment, tilt angle 14 is about 1 degree.

According to an aspect of this invention, the thickness profiles of the peripheral region may be defined radially, i.e., along radii generating from the lens center. In theory, the peripheral thickness profiles could be defined along an infinite number of such radii, but in practice, one designing the toric contact lens will define the peripheral thickness profiles at a selected number of radial increments. This is illustrated in FIG. 1, showing the radial 16 spaced by interval 15. Preferably, the peripheral thickness profiles are defined by at least twelve radial increments. As an example, the illustrated embodiment includes 24 radial increments, spaced at 15-degree intervals.

As mentioned, the thickness profiles of the peripheral region are independent of the tilt between the optical zone surfaces, since these tilted surfaces are restricted to the optical zone 11. Prism is present only in the optical zone, thereby placing less restrictions on design of the peripheral region.

According to various aspects, the maximum thicknesses of the radial thickness profiles in an inferior section 17 of the peripheral region are greater than radial thickness profiles in a superior section 18 of the peripheral region. This is shown in the embodiment illustrated in FIG. 2. Line A-A in FIG. 1 corresponds to what is commonly referred to as the vertical meridian of a contact lens. The upper half of the contact lens is commonly referred to as the superior section 18, and the lower half is commonly referred to as the inferior section 17. For reference purposes, the top of the vertical meridian is referenced as the 90-degree position, and the bottom of the vertical meridian is referenced as 270-degree position. For the illustrated embodiment, the halves of the contact lens lying on the two sides of the vertical meridian are mirror images.

A representative example of the peripheral region follows, to illustrate one manner of designing the peripheral regions. For the peripheral region between radii 16 corresponding to 225 degrees and 315 degrees, the radial thickness profiles along these radii 16 may have a fairly consistent maximum thickness, which also represents the maximum thickness present in the peripheral region 13. For the peripheral region between radii 16 at 315 degrees and 0 degrees, the radial thickness profiles may then have maximum thicknesses that taper downwardly from 315 degrees to 0 degrees. Similarly, for the peripheral region between 225 degrees and 180 degrees, the radial thickness profiles may then have maximum thicknesses that taper downwardly from 225 degrees to 180 degrees.

Along each radii 16, the thickness can taper downwardly along that radii, i.e., taper downwardly from the maximum thickness as the edge 40 of the contact lens is approached.

Of course, other peripheral region designs may be selected. The main considerations are to provide a peripheral region that provides a contact lens that is relatively easy for a practitioner to fit and that is not uncomfortable while worn. Additionally, the peripheral region, in conjunction with the prism in the optical zone, provides a prism ballasted contact lens. The prism ballast inhibits rotation of the contact lens while worn. Additionally, in the case where the contact lens does become rotationally misaligned while worn, the prism ballast returns the contact lens to its intended rotational alignment upon interaction with the eyelids during blinking.

As in conventional toric contact lenses, optical zone 11 provides the desired cylindrical and spherical refractive corrections. In other words, optical zone surfaces 21, 31, in conjunction with each other, provide the refractive corrections, with the toric optical zone surface ensuring the desired cylindrical correction. The non-toric optical zone surface may be spherical or may be a non-toric asphere. An example of a non-toric asphere is one which imparts a predetermined amount of spherical aberration to the refractive correction of the optical zone, as disclosed in U.S. Pat. No. 5,815,239, for example, the disclosure of which is incorporated by reference herein. The non-toric optic zone surface further may comprise a multifocal surface, such as where the non-toric optic zone surface includes a central optic zone providing a near vision correction and an outer optic zone providing a far vision correction. The non-toric optic zone surface may further include an intermediate optic zone, between a central optic zone and an outer optic zone, providing an intermediate vision correction. Multifocal optic zone surface designs which may be employed in the present invention include those disclosed in U.S. Pat. No. 5,754,270, for example, the disclosure of which is incorporated by reference herein.

In the discussion of the illustrated representative embodiment, the posterior optical zone surface 21 was sometimes described as toric with the anterior optical surface 31 being described as non-toric. However, this invention is applicable for back surface toric contact lenses and front surface toric contact lenses. Accordingly, this invention includes the posterior optical zone surface 21 being non-toric with the anterior optical surface 31 being toric.

Although certain illustrative embodiments have been described, the invention is not limited thereto and modifications and variations would be evident to a person of ordinary skill in the art.

We claim:
1. A contact lens comprising:
   (a) an optical zone and a peripheral region surrounding the optical zone;
   (b) a posterior surface comprising a posterior optical zone surface having a posterior center point, and a posterior peripheral zone; and

(c) an anterior surface comprising an anterior optical zone surface having an anterior center point, and an anterior peripheral zone;

(d) wherein one of the posterior optical zone and the anterior optical zone surfaces is a toric optical zone surface and the other of the posterior optical zone and the anterior optical zone surfaces is a non-toric optical zone surface;

(e) wherein the posterior and the anterior center points are aligned with one another, such that a centerline intersecting said center points is perpendicular to the toric optical zone surface at its center point;

(f) wherein the non-toric optical zone surface is non-perpendicular to the centerline at its center point, such that the anterior optical zone surface and the posterior optical zone surface are tilted with respect to one another to define a tilt angle therebetween, thereby forming prism in the optical zone;

(g) wherein the posterior and anterior peripheral zones define the peripheral region of the contact lens, wherein thickness profiles of the peripheral region are defined radially, and wherein the tilt angle of the anterior optical zone and posterior optical zone surfaces tilted with respect to one another is restricted to the optical zone such that the thickness profiles of the peripheral region are independent of said tilt angle.

2. The contact lens of claim 1, wherein the posterior optical zone surface is a toric optical zone surface and the anterior optical zone surface is a non-toric optical zone surface.

3. The contact lens of claim 1, wherein the anterior optical zone surface is a toric optical zone surface and the posterior optical zone surface is a non-toric optical zone surface.

4. The contact lens of claim 1, wherein the tilt angle has a magnitude between 0.1 and 5 degrees.

5. The contact lens of claim 4, wherein the tilt angle has a magnitude between 0.5 and 2 degrees.

6. The contact lens of claim 5, wherein the tilt angle has a magnitude of about 1 degree.

7. The contact lens of claim 1, wherein the thickness profiles of the peripheral region are defined at radial increments.

8. The contact lens of claim 7, comprising at least twelve radial increments.

9. The contact lens of claim 8, containing at least 24 radial increments.

10. The contact lens of claim 1, wherein maximum thicknesses of radial thickness profiles in an inferior section of the peripheral region are greater than radial thickness profiles in a superior section of the peripheral region.

11. The contact lens of claim 2, wherein the anterior optical zone surface is spherical.

12. The contact lens of claim 2, wherein the anterior optical zone surface is a non-toric asphere.

13. The contact lens of claim 12, wherein the anterior optical zone surface is aspherical to impart a predetermined amount of spherical aberration to a refractive correction of the optical zone.

14. The contact lens of claim 3, wherein the posterior optical zone surface is spherical.

15. The contact lens of claim 3, wherein the posterior optical zone surface is a non-toric asphere.

16. The contact lens of claim 15, wherein the posterior optical zone surface is aspherical to impart a predetermined amount of spherical aberration to a refractive correction of the optical zone.

17. The contact lens of claim 1, wherein the non-toric optic zone surface is a multifocal surface.

* * * * *